United States Patent
Faure et al.

(10) Patent No.: US 7,702,243 B2
(45) Date of Patent: Apr. 20, 2010

(54) FLEXIBLE NODE ARCHITECTURE WITH FULL PROTECTION

(75) Inventors: Jean-Paul Faure, Paris (FR); Rachid Laalaoua, Savigny sur Orge (FR)

(73) Assignee: Alcatel, Paris (FR)

( * ) Notice: Subject to any disclaimer, the term of this patent is extended or adjusted under 35 U.S.C. 154(b) by 751 days.

(21) Appl. No.: 11/560,463

(22) Filed: Nov. 16, 2006

(65) Prior Publication Data
US 2007/0116469 A1 May 24, 2007

(30) Foreign Application Priority Data
Nov. 18, 2005 (EP) .................................. 05300944

(51) Int. Cl.
*H04J 14/02* (2006.01)
(52) U.S. Cl. ............................. 398/83; 398/79; 398/59; 385/24; 385/16; 385/17; 385/18
(58) Field of Classification Search .................. 398/83, 398/79, 45, 46, 47, 48, 49, 50, 52, 54, 56, 398/87, 59; 385/24, 37, 16, 17, 18
See application file for complete search history.

(56) References Cited
U.S. PATENT DOCUMENTS
6,996,307 B2 * 2/2006 Chandrasekhar et al. ...... 385/24

| 2002/0186434 | A1 | 12/2002 | Roorda |
| 2003/0138252 | A1 | 7/2003 | Paiam |
| 2006/0045532 | A1* | 3/2006 | Yano ........................... 398/147 |
| 2006/0098981 | A1* | 5/2006 | Miura et al. ................... 398/45 |

FOREIGN PATENT DOCUMENTS
EP 1 017 242 A1 7/2000

OTHER PUBLICATIONS

Eugenio Iannone et al, "Optical path technologies: A Comparison Among Different Cross-Connect Architectures" Journal of Lightwave Technology, IEEE Service Center, NY, NY, US, vol. 14, No. 10, Oct. 1996, pp. 2184-2196, XP000631516.

* cited by examiner

*Primary Examiner*—Hanh Phan
(74) *Attorney, Agent, or Firm*—Carmen Patti Law Group, LLC

(57) ABSTRACT

Optical node (1) comprising at least one input port (PA, PC, PE) and a plurality of output ports (PB, PD, PF), at least one add unit (3B, 3D, 3F) for adding at least one signal on an output port (PB, PD, PF), a broadcasting unit (8) for broadcasting on at least two output ports (PB, PD, PF) the express traffic received on an input port (PA, PC, PE), characterized in that the broadcasting unit (8) is configured for broadcasting at least one added signal on at least two output ports (PB, PD, PF).

8 Claims, 6 Drawing Sheets

FIG_1

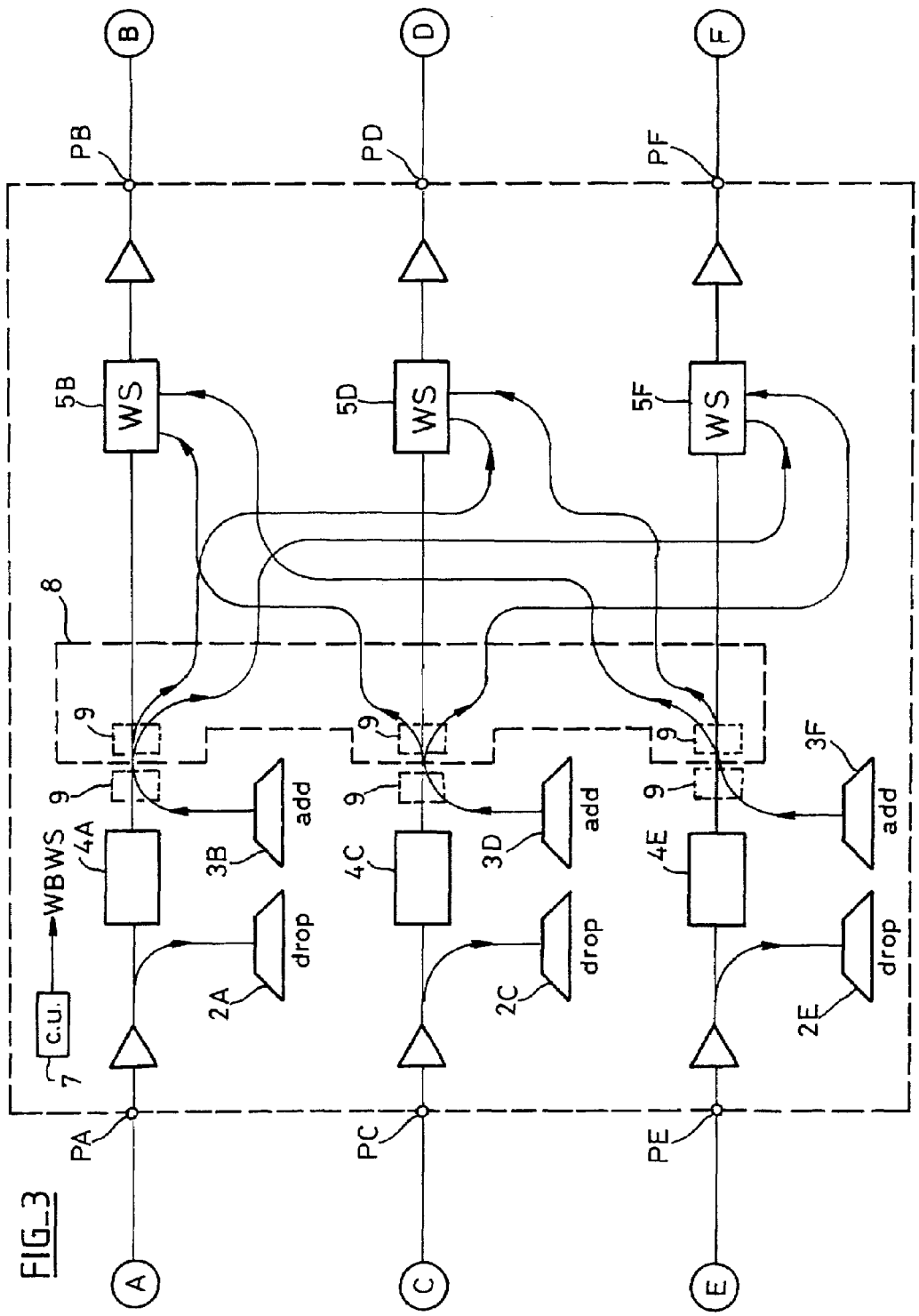
FIG_3

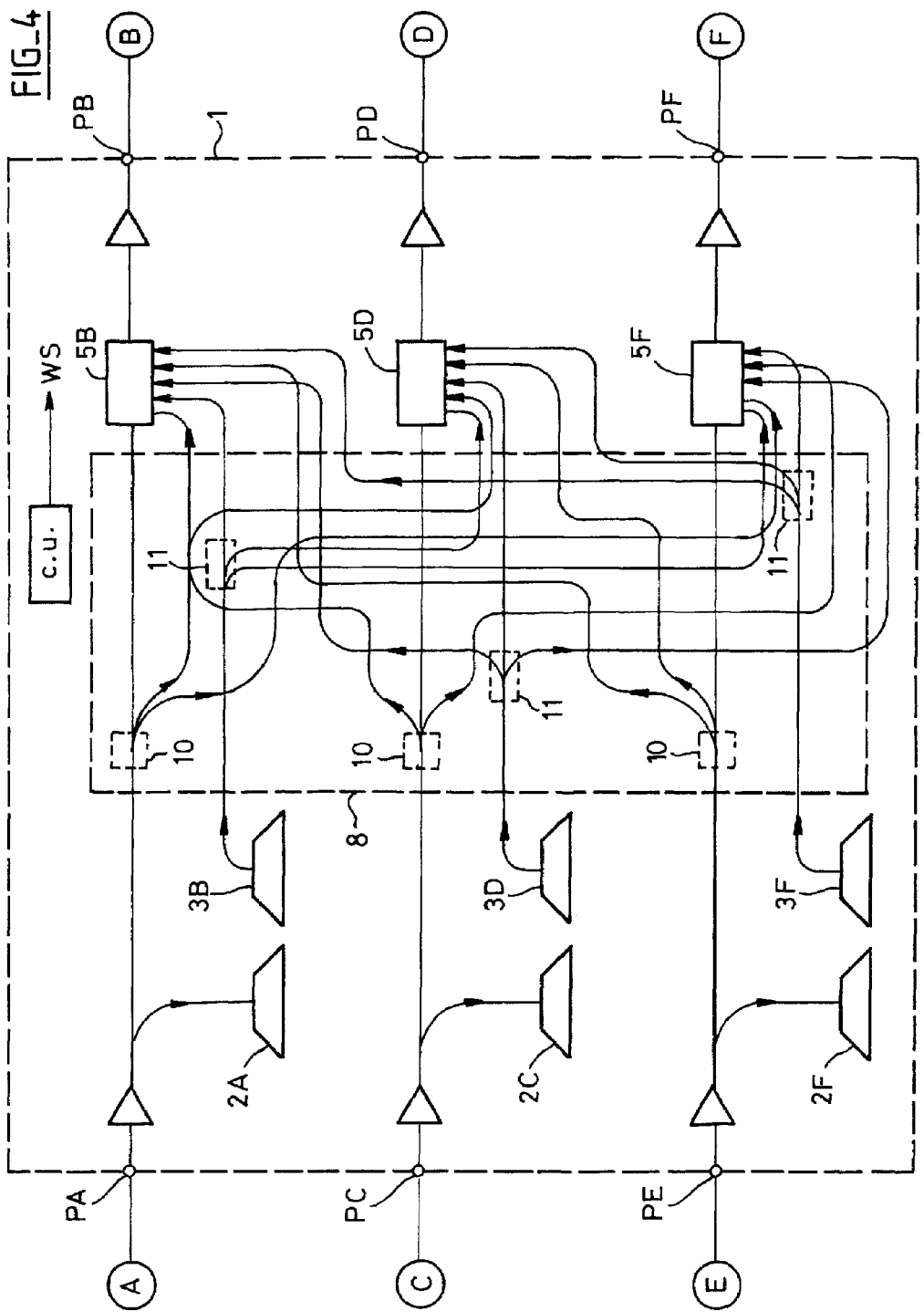

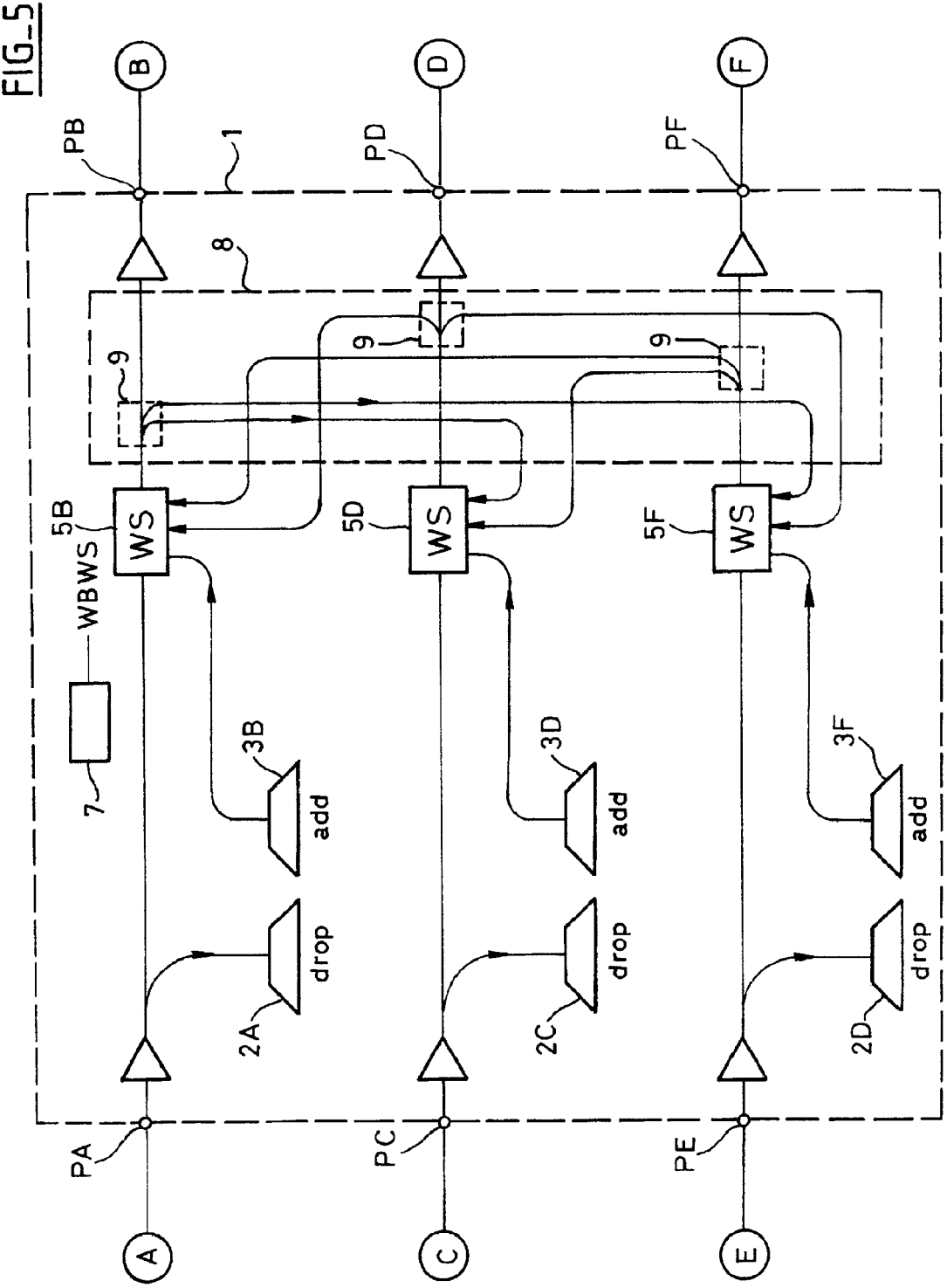

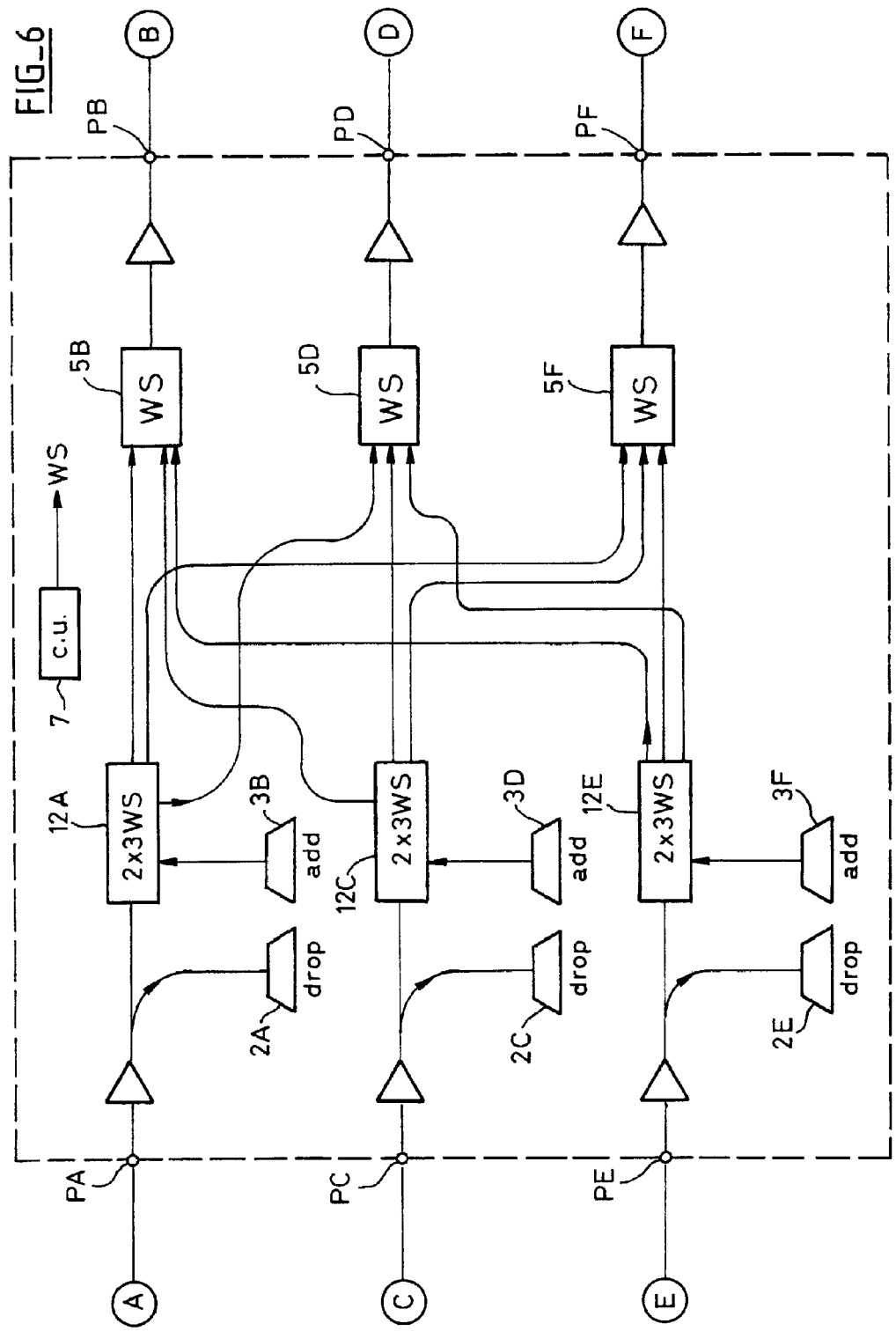

FLEXIBLE NODE ARCHITECTURE WITH FULL PROTECTION

The present invention is related to WDM networks and more particularly to node architecture within such networks.

Figure 1:
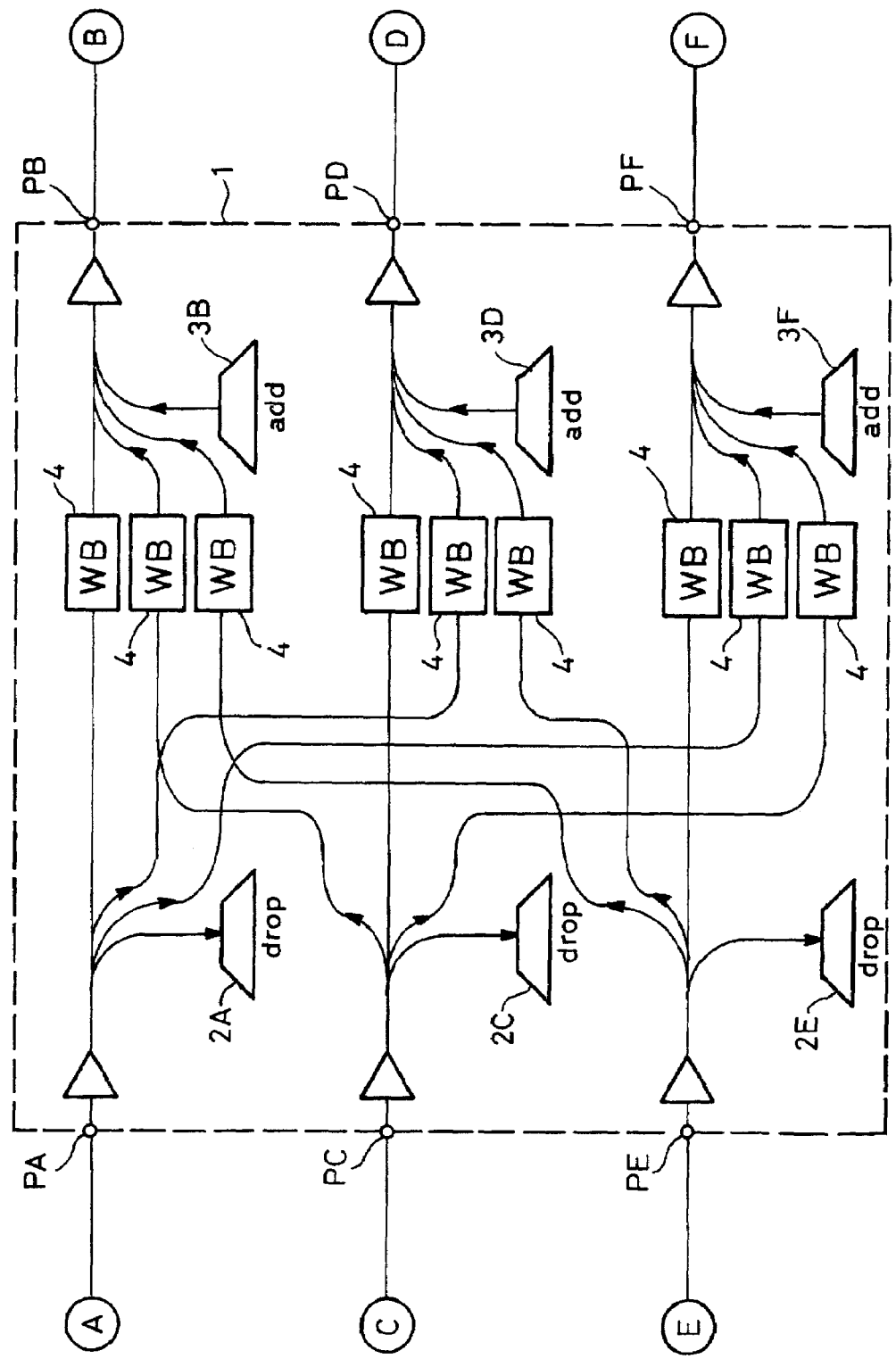

A conventional node architecture is shown on FIG. 1. The node 1 has three input ports PA, PC and PE for receiving incoming traffic from nodes A, C and E, respectively, and three output ports PB, PD and PF for forwarding to nodes B, D and F, respectively, signals corresponding to the incoming traffic modified by dropping and/or adding signals. The node comprises drop units 2A, 2C and 2E for dropping signals received from nodes A, C and E, respectively, and add units 3B, 3D and 3F, for adding signals to be forwarded to nodes B, D and F, respectively. Incoming signals from nodes A, C and E are supplied to the drop units 2A, 2C and 2D, respectively, and to wavelength blockers 4. Each wavelength blocker 4 is adapted to stop the signals to be dropped but to let go through the other signals. This would apply to data signals. In case of e.g. video-on-demand signals, each wavelength blocker could be adapted to drop and let the signal go through ("drop and continue"). The node is configured so that each non-dropped signal received from nodes A, C and E is supplied—broadcast—through wavelength blockers 4 to each output PB, PD and PF. Thus in case, e.g. a fibre cut occurs between node 1 and node B, the signal forwarded to output PB may be received by node B through output PD or PF, provided that a further connection exists downstream of node 1 between node B and either node D or F. This provides protection for so-called express traffic (signals which not added in node 1).

In this conventional node architecture, add units 3B, 3D and 3F, for adding optical signals to be sent to nodes B, D and F, respectively, are inserted after the wavelength blockers 4. Thus each signal input by each add unit 3B, 3D and 3F is supplied through a single one output PB, PD or PF, respectively, to a single node B, D or F, respectively.

The node further comprises a control unit (not shown) for controlling the wavelength blockers and wavelength switches according to routing instructions received from the network manager.

Figure 2:
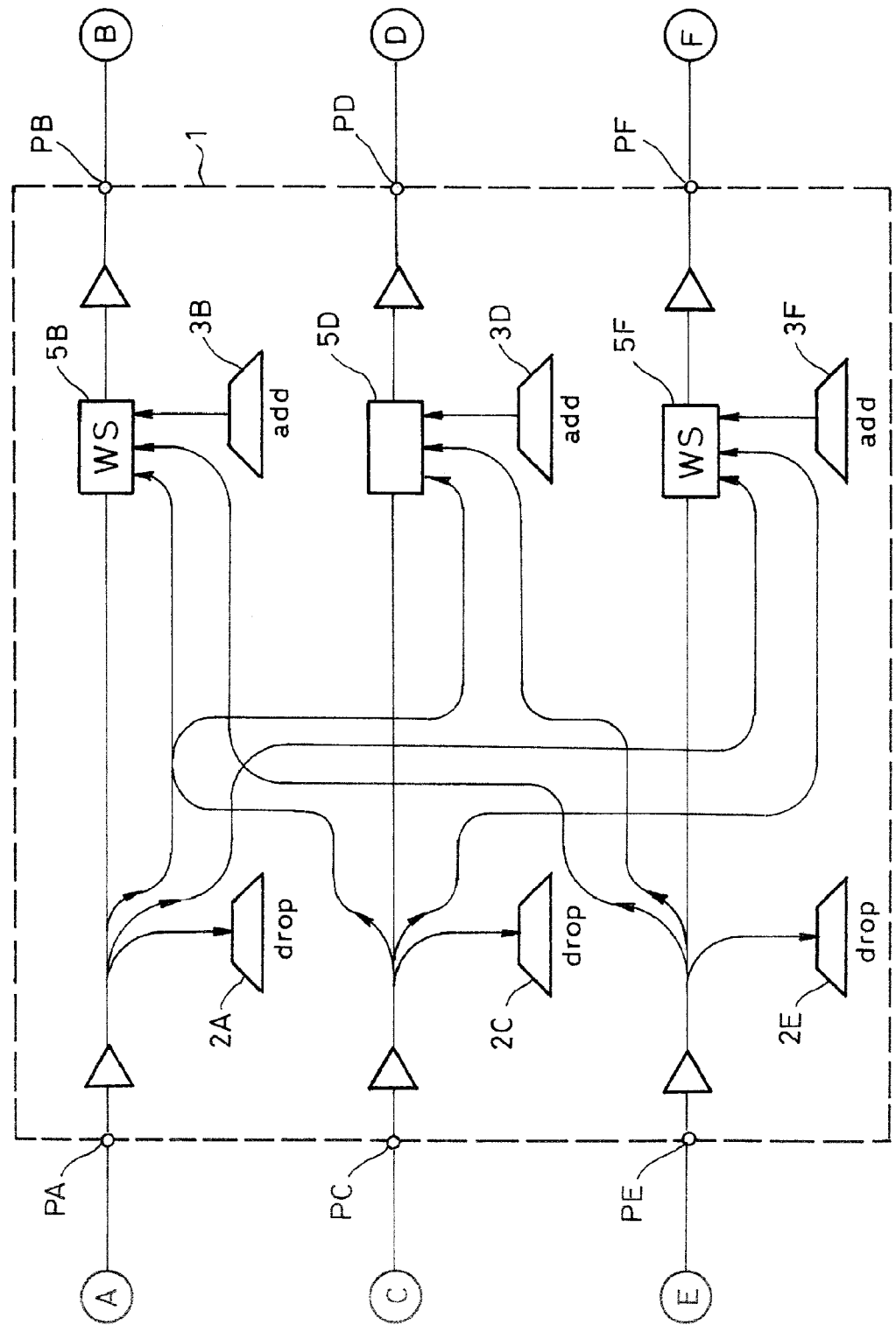

FIG. 2 is derived from another prior art node architecture based on wavelength switches (WS). A wavelength switch may be used as a N×1 multiplexer or a 1×N demultiplexer. Details on the functioning of a wavelength switch and the prior art node architecture may be found in e.g. "The MWS 1×4: a high performance wavelength switching building block", T. Ducellier et al., presented at ECOC 2002.

As shown on FIG. 2, an incoming traffic from node A, C or E is forwarded to a drop unit 2A, 2C or 2E, respectively, and to each one of wavelength switches 5B, 5D and 5F, respectively. Each wavelength switch is used as a multiplexer and receives the traffic from each node A, C and E, as well as an add signal received from an add unit 3B, 3D and 3F, respectively. Each wavelength switch is configured to block the signals to be dropped in drop units 2A, 2C and 2E (or "drop and continue" as indicated with respect to FIG. 1). The signal outputs by each wavelength switch 5A, 5C and 5E to nodes B, D and F, respectively, thus comprises the express traffic received from each node A, C and E, as well as the add signal received from the respective add unit 3B, 3D and 3F.

A drawback of each one of the two arrangements shown on FIGS. 1 and 2 is that when a fibre cut occurs between node 1 and node B (respectively D or F), the signal added by the add unit 3B (respectively 3D or 3F) on output PB (respectively PD or PF) is not protected and is thus lost.

Iannone et al. J. of Lightwave Technology, IEEE Service Center, Vol. 14, pp 2184-2196 (XP000631516) disclose optical cross-connect architectures based on discrete components, such as demultiplexers, space switches and star couplers.

The purpose of the invention is to provide a better protection for added traffic.

This problem is solved by an optical node comprising at least one input port and a plurality of output ports, a drop unit for dropping at least one optical signal received on an input port, an add unit for adding at least an optical signal on an output port, a broadcasting unit for broadcasting on at least two output ports the express traffic received on an input port, characterised in that the broadcasting unit is configured for broadcasting at least one added signal on at least two output ports.

According to a preferred embodiment, the node further comprises at least one drop unit for dropping an incoming signal and a corresponding wavelength blocker for blocking the signal to be dropped and to let go through the express traffic.

According to a further preferred embodiment, the node comprises wavelength switches for receiving the express traffic from each input port and the added traffic from each add unit.

Preferably, the broadcasting unit is configured for combining each express traffic with its corresponding added traffic and to broadcast each combined traffic to each wavelength switch.

Alternatively, the broadcasting unit is configured for broadcasting each express traffic to each wavelength switch and for broadcasting each added traffic to each wavelength switch.

The broadcasting unit may also be located between the wavelength switches and the output ports and be configured for connecting at least the output port of one of the wavelength switches to at least an input port of at least two other wavelength switches.

The broadcasting unit advantageously comprises optical couplers.

The invention is herein described, by way of example only, with reference to the accompanying drawings, wherein:

FIG. 1, already described, shows a prior art node architecture based on wavelength blockers, FIG. 2, already described, shows a prior art node architecture based on wavelength switches, FIG. 3 shows a first embodiment of a node architecture according to the invention, FIG. 4 shows a second embodiment of a node architecture according to the invention, FIG. 5 shows a third embodiment of a node architecture according to the invention; and FIG. 6 shows an embodiment with 2×3 switches.

The invention relates to a node which comprises at least one input port for receiving incoming traffic from at least one node and a plurality of output ports for forwarding traffic to a plurality of nodes.

A first embodiment of a node architecture according to the invention is shown on FIG. 3. In this embodiment, as a matter of example, the node 1 comprises three input ports PA, PC and PE for receiving an incoming traffic from nodes A, C and E, respectively, and three output ports PB, PD and PF for forwarding traffic to nodes B, D and F. It further comprises drop units 2A, 2C and 2E for dropping signals received on input ports PA, PC and PE, respectively, and add units 3B, 3D and 3F for adding signals on output ports PB, PD and PF, respectively.

The node 1 further comprises wavelength blockers 4A, 4C and 4E for blocking (or "drop and continue") the signals to be dropped to drop units 2A, 2C and 2E, respectively. Downstream of each wavelength blocker the signals supplied by add units 3B, 3D and 3F are coupled to the express traffic going through wavelength blockers 4A, 4C and 4E, respectively. Upstream of the output ports PB, PD and PF are also located wavelength switches 5B, 5D and 5F (in this case 3×1 switches). The wavelength blockers 4A, 4C and 4E and the wavelength switches 5B, 5D and 5F are controlled by a control unit 7 according to routing instructions received from the network manager. As in the prior art, a broadcasting unit 8 broadcasts each express traffic received on input ports PA, PC and PE to each wavelength switch 5B, 5D and 5F. This broadcasting unit may be comprised of a plurality of optical couplers 9.

According to the invention, each signal supplied by the add units 3B, 3D and 3F is also broadcast to each output port PB, PD and PF. This is achieved in the embodiment of FIG. 3 by combining the express traffic with the added traffic upstream of the broadcasting unit 8. Thus, the broadcasting unit 8 does not only broadcast the express traffic, as in the prior art, but also the added traffic.

Therefore in case of a fibre cut between node 1 and e.g. node B, the traffic added by the add unit 3B can still be received by node B, provided that a connection exists between node B and either node D or F.

A second embodiment of the invention is shown on FIG. 4. This embodiment has the same general structure as the one of the prior art embodiment shown on FIG. 2. The difference is that the traffic added by each add unit 3B, 3D or 3F is broadcast directly to each one of the wavelength switches 5B, 5D and 5F. This is achieved by modifying the broadcasting unit 8: a first set of couplers 10 broadcasts each express traffic to all wavelength switches 5B, 5D and 5F and a second set of couplers 11 broadcasts each added traffic to all wavelength switches 5B, 5D and 5F.

The second embodiment of the invention is simpler than the first embodiment of the invention in that it does not require the wavelength blockers 4A, 4C and 4E, the blocking of the dropped signals being carried out by the wavelength switches 5B, 5D and 5F.

Although this is at present not considered to be of any advantage, it is possible when needed to combine in a node 1 an architecture with a wavelength blocker and an add unit as shown on FIG. 3, between one input port and one output port, and an architecture with no wavelength blocker as shown on FIG. 4, between another one input port and another one output port.

A third embodiment of the invention is shown on FIG. 5. This embodiment is similar to the one of the second embodiment except in the arrangement of the broadcasting unit 8. In this embodiment, the added traffic supplied by each add unit 3B, 3D and 3F is forwarded directly to the respective wavelength switch 5B, 5D and 5F. The broadcasting unit 8 is located between the wavelength switches 5B, 5D and 5F and the output ports PB, PD and PF and is arranged to broadcast each signal supplied by a wavelength switch, e.g. 5B, to one input of each of the two other wavelength switches 5D and 5F.

It will be apparent to the man skilled in the art that other arrangements of wavelength blockers and/or wavelength switches, combined with an appropriately configured broadcasting unit, may be used to achieve the result of broadcasting the added traffic.

In the embodiments described with reference to FIGS. 3 to 5, the wavelength switches are of the N×1-type. Other types of wavelength switches may also be used, such as 2×N-type switches. A M×N switch may be obtained by combining M×1 and 1×N switches, as shown for example, in the case N=M=4, on FIG. 1 of the article "The MWS 1×4: A high performance wavelength switching building block", already cited.

An embodiment of the invention with 2×3 switches is shown on FIG. 6. In this embodiment, the drop units 2A, 2C and 2E are connected as in the previous embodiments of the invention. The express traffic received on input ports PA, PC and PE is supplied to an input port of a respective 2×3 wavelength switch 12A, 12C and 12E. The second input port of each 2×3 wavelength switch receives the respective added traffic provided by the respective add unit 3B, 3D and 3F. The three output ports of 2×3 wavelength switch 12A are then each connected to an input port of 3×1 wavelength switches 5B, 5D and 5F. Similarly, the output ports of 2×3 wavelength switches 12C and 12E are each connected to an input port of 3×1 wavelength switches 5B, 5D and 5F.

This configuration provides the required protection of the express traffic and of the added traffic.

On all the embodiments of the invention shown on FIGS. 3 to 5, optical amplifiers are provided at the input ports and the output ports of node 1. It is to be understood that these amplifiers are optional and may be omitted if there is no need to amplify the signals received or sent by the node 1. On the other hand, amplifiers may be needed on add/drop splitters to recover any signal power loss.

The invention was described with a node 1 comprising three input ports and three output ports. The invention is of course not limited to this arrangement, but encompasses any node comprising at least one input port and a plurality of output ports. The number of input ports may be different— larger or smaller—than the number of output ports. Also, drop units need not to be present after each input port of the node 1. A node with no drop unit falls within the scope of the invention. In the case a drop unit is not needed, then the corresponding wavelength blocker in the embodiment shown on FIG. 3 is not necessary. Similarly, add units need not to be present for each output port of the node. A node with at least one add unit falls within the scope of the invention. Also, although it is preferable that each added traffic be broadcast to all output ports of the node, the invention encompasses a node were at least one added traffic is provided on a plurality but not all of the output ports.

The invention claimed is:

1. Optical node comprising at least one input port, and a plurality of output ports, each output port of the optical node arranged downstream of am output port of a wavelength switch, each said wavelength switch having a plurality of input ports and operating as a controlled multiplexer for forming an output signal by combining wavelength channels selected among the optical signals received on the input ports of the wavelength switch, said optical node comprising a broadcasting unit for broadcasting on at least two wavelength switches corresponding to at least two output ports of the optical node an express traffic received on said at least one input port, characterized in that said optical node comprises at least one add unit for adding at least one signal on an output port and in that the broadcasting unit is configured for broadcasting at least one added signal from said at least one add unit on at least two wavelength switches arranged upstream of at least two output ports of the optical node.

2. Optical node according to claim 1 characterized in that it comprises at least one drop unit for dropping an incoming signal and a corresponding wavelength blocker for blocking the signal to be dropped and to let go through the express traffic.

3. Optical node according to claim 1, characterized in that the broadcasting unit is configured for combining said express traffic with a corresponding added traffic and for broadcasting the combined traffic to each said wavelength switch.

4. Optical node according to claim 3, characterized in that it comprises optical couplers.

5. Optical node according to claim 1, characterized in that the broadcasting unit is configured for broadcasting said express traffic to each said wavelength switch and for broadcasting said at least one added signal to each said wavelength switch.

6. Optical node according to claim 1, characterized in that the broadcasting unit is comprised of a plurality of optical couplers.

7. Optical node according to claim 1, characterized in that the broadcasting unit is located between said output ports of the wavelength switches and the output ports of the optical node and is configured for connecting the output port of at least one of the wavelength switches to input ports of at least two other wavelength switches.

8. Optical node according to claim 1, characterized in that it comprises 2×N wavelength switches, each 2×N wavelength switch for receiving an incoming traffic from one input port and the corresponding added traffic from add unit and for supplying the express traffic and the added traffic to each output port.

* * * * *